(12) United States Patent
Costanzo et al.

(10) Patent No.: US 8,410,924 B2
(45) Date of Patent: Apr. 2, 2013

(54) METHOD AND SYSTEM FOR REMOTE MONITORING DEFORMATIONS OF A STRUCTURE

(75) Inventors: Alessandra Costanzo, Bologna (IT); Andrea Benedetti, Bologna (IT); Vittorio Rizzoli, Bologna (IT)

(73) Assignee: Alma Mater Studiorum—Universita' di Bologna, Bologna (IT)

( * ) Notice: Subject to any disclaimer, the term of this patent is extended or adjusted under 35 U.S.C. 154(b) by 651 days.

(21) Appl. No.: 12/598,889

(22) PCT Filed: May 2, 2008

(86) PCT No.: PCT/IB2008/001095
§ 371 (c)(1),
(2), (4) Date: Apr. 21, 2010

(87) PCT Pub. No.: WO2008/135841
PCT Pub. Date: Nov. 13, 2008

(65) Prior Publication Data
US 2010/0201378 A1   Aug. 12, 2010

(30) Foreign Application Priority Data
May 4, 2007   (IT) .............................. BO2007A0322

(51) Int. Cl.
*G08B 1/08* (2006.01)
*G01B 7/16* (2006.01)
*G01F 25/00* (2006.01)
*G01L 1/00* (2006.01)

(52) U.S. Cl. .......................... 340/539.1; 73/763; 73/767

(58) Field of Classification Search ............... 340/539.1; 73/763, 767, 773, 781; 29/621.1
See application file for complete search history.

(56) References Cited

U.S. PATENT DOCUMENTS

| | | | |
|---|---|---|---|
| 7,915,707 B2 * | 3/2011 | Dekker et al. ............... | 257/528 |
| 2006/0025897 A1 | 2/2006 | Shostak et al. | |
| 2009/0188324 A1 * | 7/2009 | Gregory et al. ............... | 73/773 |
| 2012/0011938 A1 * | 1/2012 | Grange ........................ | 73/763 |
| 2012/0101669 A1 * | 4/2012 | Spanhake .................... | 701/21 |

FOREIGN PATENT DOCUMENTS
WO   WO-03/085360 A1   10/2003

OTHER PUBLICATIONS

European Search Report in EP11161967 dated May 30, 2011.
International Search Report in PCT/IB2008/001095 dated Nov. 13, 2008.

* cited by examiner

*Primary Examiner* — John A Tweel, Jr.
(74) *Attorney, Agent, or Firm* — Marshall, Gerstein & Borun LLP

(57) ABSTRACT

A low-cost and non-invasive method for remote monitoring deformations of a structure (2), which method envisages to couple at least two RFID tags (3) to the structure (2) in its respective points (10a, 10b, 10a-10c), to interrogate at radio frequency the RFID tags (3) so that a resultant electromagnetic field is produced at a certain distance (DINF) from the structure (2), the resultant electromagnetic field ensuing from a combination of the electromagnetic fields produced individually by each RFID tags (3) in response to the interrogation, to measure the resultant electromagnetic field at such a distance (DINF) from the structure (2) for obtaining measurements of the resultant electromagnetic field, and to determine the deformations of the structure (2) as a function of the measurements of the resultant electromagnetic field.

22 Claims, 1 Drawing Sheet

METHOD AND SYSTEM FOR REMOTE MONITORING DEFORMATIONS OF A STRUCTURE

CROSS-REFERENCE TO RELATED APPLICATIONS

This is the U.S. national phase application of PCT/IB2008/001095, filed May 2, 2008, which claims the benefit of Italian patent application No. BO 2007A000322, filed May 4, 2007.

TECHNICAL FIELD

The present invention relates to a method and to a system for remote monitoring deformations of a structure.

In particular, the present invention is advantageously, but not exclusively intended for use in the field of monitoring the state of health of structures under stress such a building, a bridge or structural parts of a means of transport or a generic machinery, or parts of a living organism, for example, a muscle or a limb, to which the following description expressly refers without prejudice to the generality thereof.

BACKGROUND ART

Deformation sensors based on radio-frequency resonant cavities whose resonant frequency depends on the size of the resonant cavity are well known. Such sensors are inserted in the stressed structural material to be monitored. When the material is subjected to a stress such as to alter the size of resonant cavity, the resonance frequency changes. Therefore, by processing the resonant frequency changes it is possible to trace the deformation of the structure. The sensor is typically equipped with a radio-frequency communication device, for example a RFID tag ("RFID tag") (Radio Frequency IDentification), to receive a variable-frequency radio signal from a remote interrogator device, to transfer such a radio signal to the resonant cavity for exciting it and to transmit back the cavity reaction to the interrogator device. In this way it is possible to remotely interrogate the sensor without physical connection, that is "wirelessly".

The resonant-cavity sensors provide fairly reliable measurements, but have the disadvantage of being rather bulky, and therefore of being particularly invasive and difficult to be installed.

An alternative is provided by the piezoelectric sensors based on MEMS technology, which sensors convert the mechanical variation of the structures to which they are attached in electric signal changes. These sensors have the advantage of having reduced dimensions, compared to those based on resonant cavities, however at the expense of lower reliability. This type of sensor too is provided with a radio-frequency communication device to transmit the information coming from the sensor to the interrogator device.

Other types of sensors are based on optical fiber Bragg gratings. Such sensors provide very accurate deformation measurements but are extremely expensive and bulky as well.

DISCLOSURE OF INVENTION

The purpose of the present invention is to achieve a system for remote monitoring deformations of a structure under stress, which overcomes the drawbacks described above and, at the same time, is easy to use and cost-effective to implement.

According to the present invention a method and a system for remote monitoring deformations of a structure are provided as set forth in the appended claims.

Further, according to the present invention a method and a system for remote monitoring displacements of points of a structure are provided as set forth in the appended claims.

BRIEF DESCRIPTION OF THE DRAWINGS

The present invention will now be described with reference to the attached drawings, illustrating a non-limiting embodiment thereof, in which.

BEST MODE FOR CARRYING OUT THE INVENTION

Figure 1:
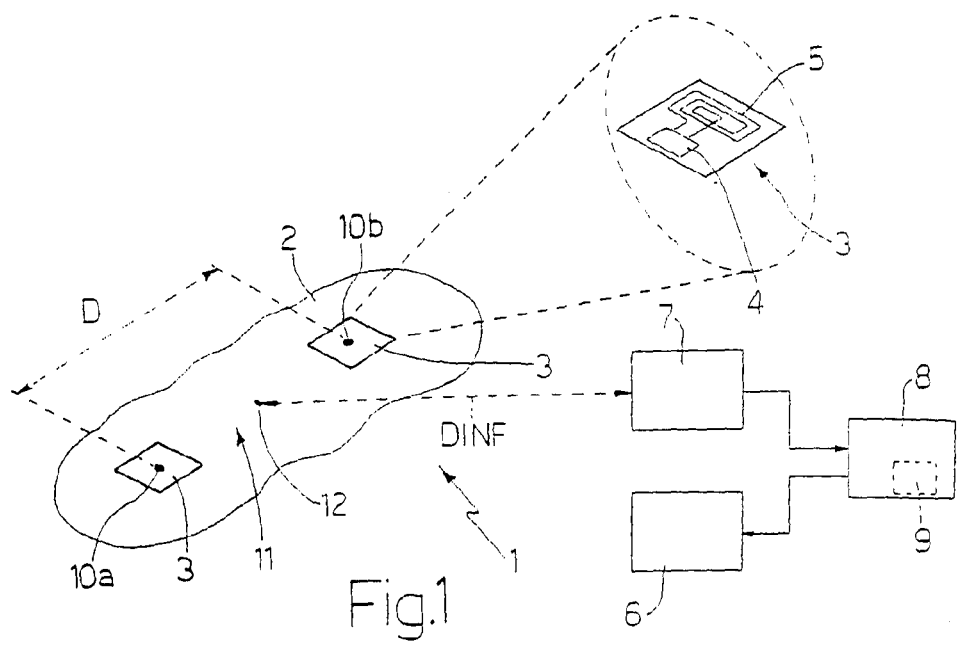
FIG. 1 illustrates a system for remote monitoring deformations of a structure according to the present invention.

In FIG. 1, number 1 generically indicates as a whole, the system for remote monitoring deformations of a structure 2.

The depicted system 1 comprises two RFID tags 3 of known type, namely of the type comprising each a microchip 4 to store information related to the RFID tag 3, including its own identification code, and a miniaturized antenna 5 connected to the microchip 4 to receive and transmit radio signals at a prescribed operating frequency F; an interrogation unit 6 of known type designed to interrogate via radio signals at the operating frequency F the RFID tags 3; an electromagnetic-field measurement unit 7 to obtain measurements of a resultant electromagnetic field produced by the RFID tags 3 in response to said interrogation; and a processing unit 8 to control the interrogation unit 6 and the measurement unit 7 in order to acquire and store, through its own internal memory 9, electromagnetic field measurements and to determine deformations of the structure 2 based on the stored electromagnetic field measurements.

Each RFID tag 3 is of active type, that is, electrically powered by its own battery (not shown), or of passive type, that is, electrically powered through the transformation of part of the radio frequency electromagnetic field received by the interrogation unit 6 during the interrogation.

According to the present invention, the two RFID tags 3 are designed to be coupled to the structure 2 in two points 10a and 10b of the structure itself, and to be positioned at a reference distance D from one another in order to monitor the deformations of a portion 11 of the structure 2 located between such points 10a and 10b. The RFID tags 3 may be coupled to the structure 2 through bonding, or by fastening with screws, or through appropriate interlocking shapes.

The processing unit 8 is configured to implement the method for remote monitoring deformations of a structure described hereinafter.

The method envisages to interrogate, through the interrogation unit 6, the RFID tags 3 so that a resultant electromagnetic field is produced at a certain distance DINF from a reference point 12 of the structure 2, such a resultant electromagnetic field ensuing from a combination of electromagnetic fields produced individually by each RFID tag 3 in response to the interrogation. Particularly, the interrogation unit 6 sends one or more radio signals that excite both RFID tags 3 in such a way that they simultaneously produce respective electromagnetic fields, which have the same frequency and phase and thus interfere with each other coherently.

Therefore, the two RFID tags 3 behave, from the electromagnetic point of view, as a phased antenna array of the broadside type.

The interrogation envisages to send a radio signal at the operating frequency F modulated, according to procedures known from the RFID standards, with the identification codes of the two RFID tags 3, which simultaneously reply to the radio signal producing respective electromagnetic fields at the operating frequency F.

Alternatively, the interrogation envisages to send, at different time slots, two radio signals at the operating frequency F, each modulated with the identification code of a respective of the RFID tags 3 and with information relating to a response delay associated to such RFID tag 3 so that the two RFID tags 3 can reply simultaneously producing respective electromagnetic fields at the operating frequency F.

Therefore, under the assumption of far-field conditions, that is at a distance DINF such that the two RFID tags 3 are comparable to punctiform sources of electromagnetic field, the resultant electromagnetic field exhibits amplitude and phase distributions, with respect to the angular coordinates (azimuth and elevation) of a polar coordinate system, which distributions have a defined dependence on the distance between points 10*a* and 10*b*. In order to fulfill the far-field conditions, the distance DINF needs to satisfy the well known relationships:

$$DINF \gg \lambda$$

$$DINF > Lmax^2/\lambda,$$

where Lmax is the largest linear dimension of the antenna 5 of the RFID tag 3 and $\lambda$ is the wavelength of the resultant electromagnetic field.

The resultant electromagnetic field is measured, by the measurement unit 7 placed at the distance DINF from the reference point 12 of the structure 2, to obtain relative amplitude and/or phase measurements.

The amplitude measurements of the resultant electromagnetic field are acquired by the processing unit 8 to build a portion of the radiation surface of the RFID tags 3 at the distance DINF as a function of the azimuth and elevation directions. Null directions are determined by means of such a radiation surface. The null radiations are the directions in which the electromagnetic field intensity is substantially equal to zero and which delimit the main lobe of the radiation surface. The angle between two null directions depends on the ratio between the distance between points 10*a* and 10*b* and the wavelength $\lambda$ of the resultant electromagnetic field, according to simple relationships, which are known from the electromagnetism theory.

The phase measurements of the resultant electromagnetic field are acquired by the processing unit 8 to be used alternatively or in combination with the amplitude measurements. The resultant electromagnetic field phase depends on the ratio between the distance between points 10*a* and 10*b* and the wavelength $\lambda$ of the resultant electromagnetic field, according to simple relationships, which are known from the electromagnetism theory.

The choice of the type of measurement to employ is made according to the quality of the radio channel involved.

The electromagnetic field at the distance DINF is measured soon after coupling the RFID tags 3 to the structure 2 in order to have measurements of a reference resultant electromagnetic field, which in the following will be referred to as "reference electromagnetic field" for the sake of simplicity and which corresponds to a reference position of the points 10*a* and 10*b* defined by the reference distance D. The reference electromagnetic field measurements are stored in the internal memory 9.

Afterwards, the electromagnetic field is measured each time the state of health of the structure 2 is required to be monitored, that is each time it is required to test whether the portion 11 has undergone deformations in terms of a mutual displacement between points 10*a* and 10*b*, and more specifically whether there has been a change of distance between points 10*a* and 10*b* with respect to the reference distance D.

The subsequent measurements of the resultant electromagnetic field are then compared with the measurements of the reference electromagnetic field in order to establish possible variations of the resultant electromagnetic field. The variations of the distance between points 10*a* and 10*b* with respect to the reference distance D are determined as a function of variations of the resultant electromagnetic field on the basis of the above mentioned relationships.

The accuracy in determining the deformations depends on the alleged order of magnitude of the deformations with respect to the wavelength $\lambda$ of the resultant electromagnetic field. Therefore, in order to measure deformations in the centimetre range the RFID tags 3 are preferably of the kind operating in the microwave band, such as those having an operating frequency F inside the 2.45 GHz band or inside the 5.8 GHz band. Similarly, in order to measure deformations in the millimetre range, the RFID tags 3 are preferably of the kind operating at millimetre-wave frequencies.

Figure 2:
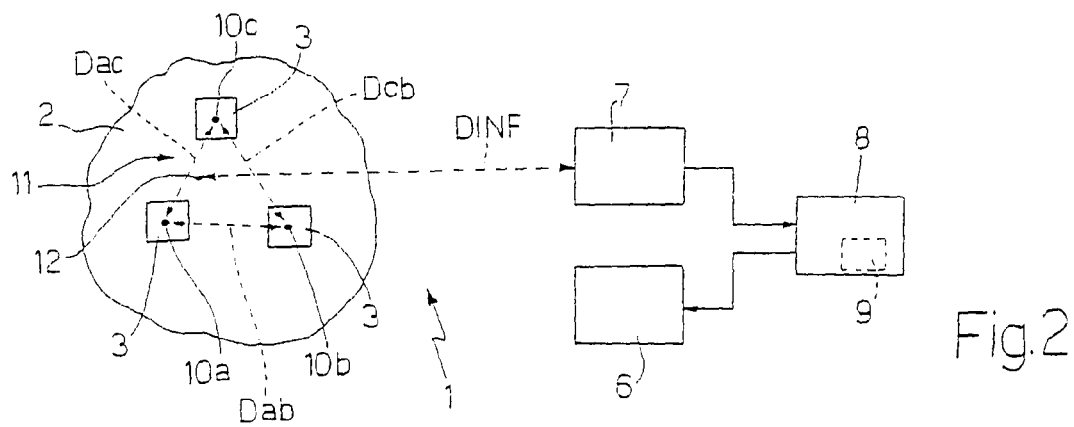
FIGS. 2 and 3 illustrate the system of FIG. 1 according to further embodiments of the present invention.

FIG. 2 illustrates a second embodiment of the present invention. The second embodiment differs from that of FIG. 1 in that the system 1 comprises more than two RFID tags 3, and in particular three RFID tags 3 designed to be coupled to the structure 2 at respective not-aligned points of it, which points are referred to as 10*a*, 10*b*, 10*c* and are positioned at relative reference distances Dab, Dac, Dbc from each other. The reference distances Dab, Dac and Dbc define a reference arrangement of the points 10*a*, 10*b* and 10*c*.

Furthermore, the method for remote monitoring deformations of a structure implemented by the processing unit 8 according to the second embodiment envisages to interrogate the RFID tags 3 in pairs and to measure the resultant electromagnetic field produced by each interrogation of RFID tag 3 in pairs. In particular, the interrogation is carried out at least for one of the combinations without repetition of a pair of RFID tags 3, that is, the two RFID tags 3 fixed in points 10*a* and 10*b*, and/or those fixed in points 10*a* and 10*c*, and/or those fixed in points 10*b* and 10*c*.

That way it is possible to monitor the deformations of a portion 11 of structure 2 comprised in the polygon whose vertexes are the points 10*a*, 10*b*, and 10*c* with respect to the reference arrangement. As an example, mutual displacements among points 10*a* 10*b* and 10*c*, that is the variations of the distances between the same points 10*a* 10*b* and 10*c* with respect to the reference distances Dab, Dac and Dbc may be further processed to find the instantaneous rotation centre of the portion 11 with respect to a fixed reference system.

In case a first of such points 10*a*, 10*b*, 10*c* is regarded as essentially fixed, as for example the point 10*a*, then it is worthwhile to interrogate only the pairs of RFID tags 3 that share the RFID tag 3 located at point 10*a* to determine the variations of the distances of points 10*b* and 10*c* from the point 10*a* with respect to the reference distances Dab and Dac respectively.

From the above it is clear that the functioning of the system 1 does not change substantially in case it comprises more than three RFID tags 3. In other words, a system 1 comprising more than three RFID tag is basically a generalisation of the system 1 having two or three RFID tags 3 that can be used to obtain more detailed information on deformations of wider portions 11 of the structure 2 to be monitored, possibly by means of triangulation techniques.

Figure 3:
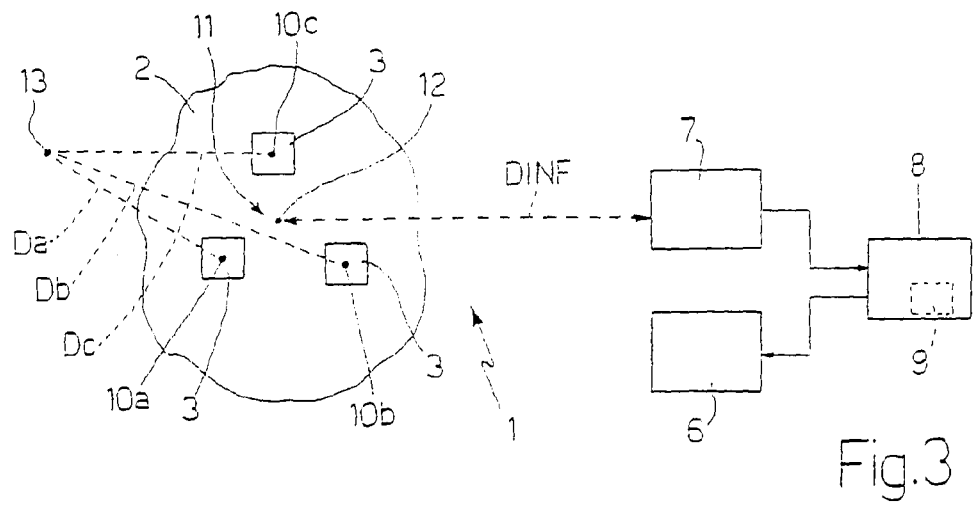

According to a third embodiment of the present invention, which is illustrated in FIG. 3 in the particular case of three RFID tags 3, the system 1 comprises a further RFID tag 3 positioned in a reference point 13 outside the structure 2 and considered fixed with respect to possible deformations or displacements of the structure 2. Particularly, the RFID tags 3 that are coupled to the structure 2 in points 10a, 10b and 10c result to be positioned at respective reference distances Da Db Dc from the reference point 13. The method for remote monitoring deformations of the structure implemented by the processing unit 8 according to the third embodiment envisages to interrogate pairs of RFID tags 3, each pair comprising the RFID tag 3 positioned in the reference point 13 in order to determine the displacements of points 10a 10b and 10c with respect to the reference point 13, that is the variations of the distances of points 10a 10b and 10c from the reference point 13 with respect to the reference distances Da, Db and Dc. This makes it possible to monitor, beside the deformation of portion 11 of the structure 2, any rigid roto-translations of the portion 11 with respect to the reference point 13. From the above it is understood that the functioning of the system 1 according to the third embodiment will not change in case the system 1 comprises two or more than three RFID tags 3.

The latter embodiment highlights another possible use of the system 1. Indeed, the underlying concept of the present invention, that is the ability to remotely monitor variations of distances between any two points in the space by interrogating two RFID tags 3 associated to these points in the way previously described and by measuring the resultant electromagnetic field produced by these sources, permits to use the system 1 as a system for remote monitoring displacements of the points 10a, 10b, and 10c of the structure 2 with respect to one of them, as for example point 10a, or with respect to an external reference point 13, with an accuracy within one millimetre. In other words, the system 1 implements a function of fine localization of objects, or parts of a same object or structure, which objects or parts of an object are coupled to respective RFID tags 3.

The main advantages of the system 1 for remote monitoring deformations of a structure described above, compared with existing systems used for the same purpose, derive from the fact that each pair of RFID tags 3 constitutes both the deformation sensor and the communication device used to transmit the information acquired by the sensor to the interrogation unit 6. This results, firstly, in much lower costs with respect to existing solutions. Secondly, the very limited size and weight of the RFID tags 3 allow to attach the RFID tag 3 to any structure 2, for instance to a sail of a boat, to a body shell of a car, or into an artificial limb, thus broadening the fields of application of the system 1.

Furthermore the system 1 works without straining the deformation sensor, which consists of two or three RFID tags 3, and this results in a further twofold advantage. First of all, it is possible to couple the deformation sensor to the structure 2 to be monitored in a non-invasive way. In addition, it is possible to monitor the magnitude of a crack in the structure 2 by means of two RFID tags 3 fixed to respective sides of such crack, up to deformations whose size may theoretically reach several wavelengths, which is impossible for any sensor based on the resonance principle.

Finally, the system 1 provides measurements substantially independent of any changes in environmental parameters, such as the humidity of the air and in particular the temperature, as well as possible variations of the RFID tags 3 behaviour, for example due to aging or exposure to the environment, since the null directions of the field depend exclusively on the array factor, and thus on the ratio between the distance between the RFID tags 3 and the wavelength λ. Therefore the system 1 does not require complex and delicate calibration procedures for compensating variations of the environmental parameters, nor the detection of values of the same. On the contrary, the environmental conditions may directly affect the results provided by sensors known so far, which need to be calibrated appropriately. As an example, a temperature variation always originates variations of the size of a resonant cavity and thus of its own resonance frequency, that could be erroneously understood as due to a deformation of the structure 2.

The invention claimed is:

1. Method for remote monitoring deformations of a structure (2), which method comprises:
    coupling at least two RFID tags (3) to the said structure (2) in respective points (9a, 9b; 9a-9c) of the structure (2) itself;
    interrogating at radio frequency the RFID tags (3) so that a resultant electromagnetic field is produced at a certain distance (DINF) from said structure (2), said resultant electromagnetic field ensuing from a combination of the electromagnetic fields singularly produced by the RFID tags (3) in response to the interrogation;
    measuring the electromagnetic field at said certain distance (DINF) to obtain measurements of said resultant electromagnetic field; and
    determining said deformations of the structure (2) as a function of the measurements of the resultant electromagnetic field.

2. Method according to claim 1, wherein coupling at least two RFID tags (3) to said structure (2) comprises coupling at least three RFID tags (3) to the structure (2) in respective points (10a-10c) of the structure itself; interrogating at radio frequency said RFID tags (3) comprising interrogating said RFID tags (3) in pairs; measuring the electromagnetic field at said certain distance (DINF) comprising measuring the electromagnetic field to obtain measurements of said resultant electromagnetic field produced by each interrogation of RFID tags (3) in pairs.

3. Method according to claim 2, wherein interrogating said RFID tags (3) in pairs comprises interrogating at least one of the combinations without repetition of two RFID tags (3).

4. Method according to claim 1, wherein said measurements of said resultant electromagnetic field comprise measurements of amplitude of the resultant electromagnetic field; determining said deformations of the structure (2) comprising:
    determining null directions of the resultant electromagnetic field from the amplitude measurements;
    determining said deformations as a function of the null directions.

5. Method according to claim 1, wherein said measurements of said resultant electromagnetic field comprise measurements of phase of the resultant electromagnetic field; said deformations of the structure (2) being deteirmined as a function of the phase measurements.

6. Method according to claim 1, wherein said points (10a, 10b; 10a-10c) of said structure (2) are positioned, at the time of coupling said RFID tags (3) to said structure (2), according to a reference arrangement; measuring the electromagnetic field at said certain distance (DINF) comprising:

obtaining reference measurements of the resultant electromagnetic field corresponding to said reference arrangement; and obtaining following monitoring measurements of the resultant electromagnetic field;

determining said deformations of the structure (2) as a function of said measurements of the resultant electromagnetic field comprising:

comparing the monitoring measurements with the reference measurements to determine variations of said resultant electromagnetic field; and determining the deformations as a function of the variations of the resultant electromagnetic field.

7. Method according claim 1, wherein said deformations of the structure (2) comprise distance variations between said points (10a, 10b; 10a-10c) of the structure (2).

8. Method according to claim 7, wherein said distances between said points (10a, 10b; 10a-10c) of the structure (2) consist of the distances of the points (10a, 10b; 10a-10c) from the first (10a) of them.

9. Method according to claim 7, wherein said points (10a, 10b; 10a-10c) of the said structure (2) are positioned, at the time of coupling said RFID tags (3) to said structure (2), at reference distances (D; Dab, Dac, Dbc) from each other; said distance variations between these points (10a, 10b, 10a-10c) being expressed referring to said reference distances (D; Dab, Dac, Dbc).

10. Method according to claim 1, comprising:
associating a further RFID tag (3) at a determined reference point (13);
said deformations of the structure (2) comprising displacements of said points (10a, 10b; 10a-10c) of the structure (2) with respect to said reference point (13).

11. Method according to claim 10, wherein said points (10a, 10b; 10a-10c) of the structure (2) are positioned, at the moment of coupling said RFID tags (3) to said structure (2), at respective reference distances (Da, Db; Da-Dc) from said reference point (13); said displacements being defined by variations of distances between said points (10a, 10b; 10a-10c) of the structure (2) and said reference point (13) with respect to said reference distances (Da, Db; Da-Dc).

12. Method according to claim 1, wherein said distance (DINF) is such that said RFID tags (3) are comparable, at said certain distance (DINF) from the structure (2), to punctiform sources of electromagnetic field.

13. Method according to claim 1, wherein interrogating at radiofrequency said RFID tags (3) comprises:
interrogating the RFID tags (3) in such a manner that they simultaneously produce respective electromagnetic fields that interfere with each other in a coherent manner thus producing said resultant electromagnetic field.

14. Method according to claim 13, wherein said electromagnetic fields simultaneously produced from the RFID tags (3) exhibit the same frequency (F) and phase.

15. Method according to claim 1, wherein each of the RFID tags (3) is of the kind operating in the microwave band.

16. Method according to claim 1, wherein each of the RFID tags (3) is of the kind operating in the millimetre wave band.

17. System for remote monitoring deformations of a structure (2), the system (1) comprising: at least two RFID tags (3) designed for being coupled to said structure (2) in respective points (9a, 9b; 9a-9c) of the structure (2) itself;
interrogator means (6) for interrogating at radio frequency the RFID tags (3); electromagnetic field measurement means (7) for obtaining measurements of a resultant electromagnetic field produced by said RFID tags (3) in response to the interrogation; processing means (8) designed for controlling said interrogator means (6) and said measurement means (7) for acquiring and processing said measurements; said processing means (8) being configured to implement the method for remote monitoring deformations of a structure (2) according to claim 1.

18. Method for remote monitoring displacements of points of a structure (2), which method comprises:
coupling at least one RFID tag (3) to said structure (2) in a respective point to be monitored (10b; 10b, 10c; 10a, 10b, 10c) of the structure (2) itself;
associating a further RFID tag (3) to a determined reference point (10a; 13);
interrogating at radio frequency the RFID tags (3) so that a resultant electromagnetic field is produced at a certain distance (DINF) from said structure (2), said resultant electromagnetic field ensuing from a combination of the electromagnetic fields individually produced by the RFID tags (3) in response to the interrogation;
measuring the electromagnetic field at said certain distance (DINF) to obtain measurements of said resultant electromagnetic field; and
determining displacements of said point to be monitored (10b; 10b,10c; 10a, 10b, 10c) as a function of said measurements of the resultant electromagnetic field.

19. Method according to claim 18, wherein said reference point (10a; 13) and said point to be monitored (10b; 10b, 10c; 10a, 10b, 10c) are positioned, at the moment of coupling said RFID tags (3) to said structure (2), according to a reference arrangement; measuring the electromagnetic field at said certain distance (DINF) comprising:
obtaining reference measurements of the resultant electromagnetic field corresponding to said reference arrangement; and
obtaining following monitoring measurements of the resultant electromagnetic field;
determining displacements of said point to be monitored (10b; 10b, 10c; 10a, 10b, 10c) as a function of said measurements of the resultant electromagnetic field comprising:
comparing the monitoring measurements with the reference measurements to determine variations of said resultant electromagnetic field; and
determining the displacements as a function of the variations of the resultant electromagnetic field.

20. Method according to claim 18, wherein said reference point (10a) is a point of said structure (2); the RFID tag (3) associated to the reference point (10a) being coupled to the structure (2) in the reference point (10a) itself.

21. Method according to claim 18, wherein said point to be monitored (10b; 10b, 10c; 10a, 10b, 10c) is positioned, at the moment of coupling said RFID tag (3) to said structure (2), at a respective reference distance (D; Dab, Dac; Da, Dc, Dc) from said reference point (10a; 13) with respect to said reference distance (D; Dab, Dac; Da, Dc, Dc); said displacements being defined by variations of a distance between said point to be monitored (10b; 10b, 10c; 10a, 10b, 10c) and said reference point (10a; 13) with respect to said reference distance (D; Dab, Dac; Da, Dc, Dc).

22. System for remote monitoring displacements of points of a structure (2), the system (1) comprising: at least two RFID tags (3), al least a first of which is designed to be coupled to said structure (2) in a respective point to be monitored (10b; 10b, 10c; 10a, 10b, 10c) of the structure (2) itself and a second of which is designed to be associated to a certain reference point (10a; 13); interrogator means (6) for interrogating at radio frequency the RFID tags (3); electromagnetic field measurement means (7) for obtaining measurements of a resultant electromagnetic field produced by said RFID tags (3) in response to the interrogation; processing means (8) designed for controlling said interrogator means (6) and said measurement means (7) for acquiring and processing said measurements; said processing means (8) being configured to implement the method for remote monitoring displacements of points of a structure (2) according to claim 18.

* * * * *

UNITED STATES PATENT AND TRADEMARK OFFICE
CERTIFICATE OF CORRECTION

| | | |
|---|---|---|
| PATENT NO. | : 8,410,924 B2 | Page 1 of 1 |
| APPLICATION NO. | : 12/598889 | |
| DATED | : April 2, 2013 | |
| INVENTOR(S) | : Costanzo et al. | |

It is certified that error appears in the above-identified patent and that said Letters Patent is hereby corrected as shown below:

In the Claims

In Column 6, Line 61, in Claim 5, delete "deteirmined" and insert -- determined --, therefor.

In Column 8, Line 37, in Claim 19, delete "deteimining" and insert -- determining --, therefor.

In Column 8, Line 62, in Claim 22, delete "al" and insert -- at --, therefor.

Signed and Sealed this
Sixteenth Day of December, 2014

Michelle K. Lee
*Deputy Director of the United States Patent and Trademark Office*